United States Patent Office 3,849,492
Patented Nov. 19, 1974

3,849,492
BIS-SALICYLOYL-HYDRAZINES
Heimo Brunetti, Reinach, Kurt Schwarzenbach, Aesch, and Andreas Schmidt, Reinach, Switzerland, assignors to Ciba-Geigy Corporation, Ardsley, N.Y.
No Drawing. Filed Oct. 4, 1971, Ser. No. 186,393
Claims priority, application Switzerland, Oct. 8, 1970, 14,967/70; Aug. 16, 1971, 11,997/71
Int. Cl. C07c *109/10*
U.S. Cl. 260—559 H       2 Claims

ABSTRACT OF THE DISCLOSURE

Bis-salicyloyl-hydrazines are stabilizers for polymers. They are prepared by reacting a corresponding salicylic acid hydrazide with a corresponding salicylic acid chloride.

---

The subject of the present invention are bis-salicyloyl-hydrazines and their use for stabilising polymers.

Polymers, such as polyolefines, especially polypropylene, because of their physical and electrical properties are very suitable for use as an insulating material in the electrical industry, especially for the sheathing and coating of copper wires, copper cables and other electrically conducting materials made of copper.

Unfortunately, however, the said good properties of the polyolefines deteriorate as a result of the fact that in contact with transition metals, especially with copper and its compounds, they undergo an oxidative degradation catalysed by these metals. Copper additions of less than 1%, for example, lead to the oxidation stability of polypropylene being reduced by a factor of ~100.

Various different derivatives of salicyloyl-hydrazine have already become known for the stabilisation of polyolefines against the harmful effect of transition metals. Thus, U.S. Pat. Specification No. 3,110,696 recommends employing N-salicyloyl-N'-salicylidene-hydrazines for this purpose. Whilst these compounds prove active as metal deactivators they have the disadvantage of causing objectionable yellow discolouration of the polymer. British Patent Specification 1,093,383 describes salicylic acid hydrazide and its alkylated, cycloalkylated and arylated derivatives, which, whilst they are in themselves colourless substances, as regards their metal-deactivating action in no way approach the above-mentioned salicylidene derivatives of salicylic acid hydrazide. The same is true of the acylation products of salicylic acid hydrazide described in Japanese Patent Publication No. 43/18,607. The two last-mentioned types of compound furthermore suffer from the disadvantage that they objectionably discolour the polyolefine either already on incorporation or under thermo-oxidative ageing conditions.

Surprisingly, it has now been found that the compounds of the formula I

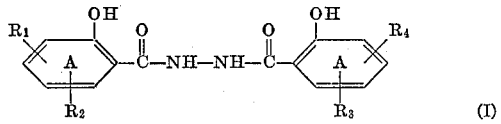

in which $R_1$, $R_2$, $R_3$ and $R_4$ independently of one another denote hydrogen, alkyl with 1 to 18 carbon atoms, alkenyl with 3 to 4 carbon atoms, cycloalkyl with 6 to 8 carbon atoms, aralkyl with 7 to 9 carbon atoms, alkoxy groups with 1 to 18 carbon atoms, the latter preferably only as substituents $R_1$ and $R_3$, phenyl and chlorine, and $R_1$ and $R_3$ independently of one another can additionally also denote hydroxyl, acyloxy with 2-18 carbon atoms or acylamino with 2-18 carbon atoms, are very suitable for the stabilisation of polymers, such as homopolymeric or copolymeric polyolefines against thermo-oxidative degradation, especially in the presence of transition metals, and that these compounds have at the same time good colour properties.

The compound of the formula I are new, with the exception of the compound in which $R_1$, $R_2$, $R_3$ and $R_4$ simultaneously denote hydrogen.

The compounds usable according to the invention are not only excellent stabilisers, the action of which markedly surpasses that of the classes of compounds described above, but additionally have the advantage of being colourless. This allows their incorporation into polyolefines without objectionably discolouring the latter. Furthermore, all the previously known compounds mentioned show the property of discolouring polyolefines under ageing conditions, whilst the compounds usable according to the invention cause practically no discolourations under these conditions, which represents a great technical advantage for long-term stabilisation.

As compared to previously known compounds, the compounds according to the invention also show the advantage of greater heat stability, that is to say they can be incorporated into polymers at high temperatures without causing objectionable bubble formation through thermal decomposition.

A further unexpected advantage of the compounds of the formula I is their simultaneous anti-oxidative activity, which is particularly distinct in compounds of the formula I wherein $R_1$ and $R_3$ are alkyl or alkoxy having at least 4, preferably at least 8 carbon atoms.

In the formula I, $R_1$, $R_2$, $R_3$ and $R_4$ for example denote an alkyl group with 1 to 18 carbon atoms, such as methyl, ethyl, propyl, butyl, sec.-butyl, tert.-butyl, n-amyl, sec.-amyl, tert.-amyl, tert.-hexyl, iso-heptyl, octyl, isooctyl, tert.-octyl, decyl, undecyl, dodecyl, tert.-dodecyl, tetradecyl or octadecyl, an alkenyl group with 3 to 4 carbon atoms, such as allyl or butenyl, a cycloalkyl group with 6 to 8 carbon atoms, such as cyclohexyl or cyclooctyl, an aralkyl group with 7 to 9 carbon atoms, such as benzyl, α-methylbenzyl or α,α-dimethylbenzyl or an alkoxy group with 1 to 18 carbon atoms, such as a methoxy, propoxy, butoxy, octoxy, decyloxy, dodecyloxy, tetradecyloxy or octadecyloxy group.

The substituents $R_1$ and $R_3$ denoting acyloxy or acylamino groups with 2 to 18 carbon atoms can be acyl derivatives of carboxylic acids, such as, for example, acetic acid, propionic acid, butyric acid, isobutyric acid, valeric acid, caproic acid, 2-ethylcaproic acid, lauric acid, capric acid, myristic acid, palmitic acid, stearic acid, acrylic acid, methacrylic acid, crotonic acid, isocrotonic acid, oleic acid, benzoic acid and phenylacetic acid.

Amongst the compounds of the formula I, those are preferred in which $R_1$, $R_2$, $R_3$ and $R_4$ independently of one another denote hydrogen, alkyl groups with 1 to 12 carbon atoms, cycloalkyl groups with 6 or 7 carbon atoms, aralkyl groups with 8 or 9 carbon atoms, phenyl and chlorine and $R_1$ and $R_3$ independently of one another also denote hydroxyl, alkoxy groups with 1 to 12 carbon atoms, acyloxy groups with 2 to 18 carbon atoms and acylamino groups with 2 to 18 carbon atoms.

Amongst the compounds of the formula I, those are particularly preferred in which $R_1$, $R_2$, $R_3$ and $R_4$ independently of one another denote hydrogen, alkyl groups with 1 to 8 carbon atoms, cyclohexyl, α-methylbenzyl, α,α-dimethylbenzyl and chlorine and $R_1$ and $R_3$ independently of one another also denote alkoxy groups with 1 to 12 carbon atoms, or those in which $R_1$ and $R_3$ independently of one another denote hydrogen, alkyl with 1 to 8 carbon atoms, alkoxy with 1 to 8 carbon atoms, phenyl, hydroxyl, chlorine, α-methylbenzyl, alkanyloxy with 2 to 18 carbon atoms or alkanoylamino with 2 to 18 carbon atoms, $R_1$ can also denote alkoxy with 9 to 17 carbon atoms and $R_2$ and $R_4$ independently of one another denote hydrogen, tert. butyl or methoxy.

The following compounds of the formula I, for example, show particularly good stabilising properties as metal deactivators:

N,N'-bis-salicyloyl-hydrazine,
N,N'-bis-(2-hydroxy-5-tert.-butylbenzoyl)-hydrazine,
N,N'-bis-(2-hydroxy-5-tert.-octylbenzoyl)hydrazine,
N,N'-bis-(2-hydroxy-3,5-di-tert.-butylbenzoyl)-hydrazine,
N,N'-bis-(2-hydroxy-5-methylbenzoyl)-hydrazine,
N,N'-bis-(2-hydroxy-5-chlorobenzoyl)-hydrazine,
N,N'-bis-(2-hydroxy-3,5-dichlorobenzoyl)-hydrazine,
N,N'-bis-(2-hydroxy-5-tert.-dodecylbenzoyl)-hydrazine,
N,N'-bis-(2-hydroxy-4,5-dimethylbenzoyl)-hydrazine,
N,N'-bis-(2-hydroxy-5-sec.-butylbenzoyl)-hydrazine,
N,N'-bis-(2-hydroxy-5-sec.-octylbenzoyl)-hydrazine,
N,N'-bis-(2-hydroxy-5-sec.-nonylbenzoyl)-hydrazine,
N,N'-bis-(2-hydroxy-5-cyclohexylbenzoyl)-hydrazine,
N,N'-bis-(2-hydroxy-5-cyclooctylbenzoyl)-hydrazine,
N,N'-bis-(2-hydroxy-5-α-methylbenzylbenzoyl)-hydrazine,
N,N'-bis-(2-hydroxy-4-methoxybenzoyl)-hydrazine,
N,N'-bis-(2-hydroxy-4-ethoxybenzoyl)-hydrazine,
N,N'-bis-(2-hydroxy-4-butoxybenzoyl)-hydrazine,
N,N'-bis-(2-hydroxy-4-dodecylbenzoyl)-hydrazine,
N,N'-bis-(2-hydroxy-4-octadecyloxybenzoyl)-hydrazine,
N,N'-bis-(2-hydroxy-4-acetoxybenzoyl)-hydrazine,
N,N'-bis-(2-hydroxy-4-lauroylbenzoyl)-hydrazine, and
N,N'-bis-(2-hydroxy-4-stearoyloxybenzoyl)-hydrazine.

The following compounds of the formula I, for example, show particularly good stabilising properties as antioxidants:

N,N'-bis-(2-hydroxy-4-octoxybenzoyl)-hydrazine,
N,N'-bis-(2-hydroxy-5-octoxybenzoyl)-hydrazine,
N-(2-hydroxy-4-octoxybenzoyl)-N'-(2-hydroxy-5-tert.-octylbenzoyl)-hydrazine,
N-(2-hydroxybenzoyl)-N'-(2-hydroxy-5-hexadecyloxybenzoyl)-hydrazine,
N-(2-hydroxybenzoyl)-N'-(2-hydroxy-5-stearyloxybenzoyl)-hydrazine,
N-(2-hydroxybenzoyl)-N'-(2-hydroxy-5-butoxybenzoyl)-hydrazine, and
N,N'-bis-(2-hydroxy-4-stearyloxybenzoyl)-hydrazine.

The compounds of the formula I provide protection against degradation for polyolefines, preferably α-olefine polymers, such as polypropylene, optionally crosslinked polyethylene, polyisobutylene, polymethylbutene-1, polymethylpentene-1, polybutene-1, polyisoprene, polybutadiene and polystyrene; copolymers of the monomers on which the homopolymers mentioned are based, such as ethylene-propylene copolymers, propylenebutene-1 copolymers, propylene-isobutylene copolymers and styrene-butadiene copolymers, and terpolymers of ethylene and propylene with a diene, such as, for example, hexadiene, dicyclopentadiene or ethylidenenorbornene; mixtures of the above-mentioned homopolymers such as, for example, mixtures of polypropylene and polyethylene, polypropylene and polybutene-1, and polypropylene and polyisobutylene; other elastomers such as natural caoutchouc; copolymers, which are derived from acrylonitril, styrene and butadiene or acrylic esters. Polypropylene as well as its mixtures and the copolymers which contain propylene units are preferred.

The compounds of the formula I are incorporated into the substrates in a concentration of 0.01 to 5% by weight calculated relative to the material to be stabilised.

Preferably, 0.05 to 1.5, and particularly preferably 0.1 to 0.8, percent by weight of the compounds, calculated relative to the material to be stabilised, are incorporated into the material.

The incorporation can be effected after the polymerisation, for example, by mixing in at least one of the compounds of the formula I, and optionally further additives, into the melt in accordance with the methods customary in the art, before or during shaping, or by applying the dissolved or dispersed compounds to the polymer, if necessary with subsequent evaporation of the solvent.

In the case of crosslinked polyethylene, the compounds are added before the crosslinking.

The polyolefines stabilised by addition of the compounds according to the invention are, in particular, suitable for use as a coating material for copper wires and cables, but also for other types of metal coating and for the manufacture of shaped articles, such as films, filaments, sheets, pipes, injection-moulded articles and the like. They can also be used mixed with copper or pigments containing copper.

As further additives together with which the stabilisers usable according to the invention can be employed, there should be mentioned:

1. Antioxidants of the aminoaryl and hydroxyaryl series. In the case of the latter, the sterically hindered phenol compounds should be mentioned, for example:

2,2'-thiobis-(4-methyl-6-tert.-butylphenol),
4,4'-thiobis-(3-methyl-6-tert.-butylphenol),
2,2'-methylene-bis-(4-methyl-6-tert.-butylphenol),
2,2'-methylene-bis-(4-ethyl-6-tert.-butylphenol),
4,4'methylene-bis-(2-methyl-6-tert.-butylphenol),
4,4'-butylidene-bis-(3-methyl-6-tert.-butylphenol),
2,2'-methylene-bis-[4-methyl-6-(α-methylcyclohexyl)-phenol],
2,6-di-(2-hydroxy-3-tert.-butyl-5-methylbenzyl)-4-methylphenol,
2,6-di-tert.-butyl-4-methylphenol,
1,1,3-tris-(2-methyl-4-hydroxy-5-tert.-butyl-phenyl)-butane, and
1,3,5-trimethyl-2,4,6-tri-(3,5-di-tert.-butyl-4-hydroxybenzyl)-benzene, esters of β-4-hydroxy-3,5-di-tert.-butylphenylpropionic acid with monohydric or polyhydric alcohols, such as methanol, ethanol, octadecanol, hexanediol, nonanediol, thiodiethylene glycol, trimethylolethane or pentaerythritol, 2,4 - bis - octylmercapto - 6 - (4 - hydroxy - 3,5 - di - tert.-butylanilino)-s-triazine, 2,4-bis-(4-hydroxy - 3,5 - di-tert.-butylphenoxy)-6-octylmercapto-s-triazine, 1,1-bis-(4-hydroxy - 2 - methyl - 5 - tert. - butyl - phenyl) - 3 - dodecylmercapto-butane, 4-hydroxy-3,5-di-tert.-butylbenzyl-phosphonic acid esters, such as the dimethyl, diethyl or dioctadecyl ester, (3-methyl-4-hydroxy-5-tert.-butylbenzyl)-malonic acid dioctadecyl ester, s-(3,5-dimethyl-4-hydroxyphenyl)-thioglycollic acid octadecyl ester, esters of bis-(3,5-di-tert.-butyl-4-hydroxy-benzyl)-malonic acid, such as the diodecyl ester, the dioctadecyl ester and the 2-dodecylmercaptoethyl ester.

Amongst the aminoaryl derivatives, aniline and naphthylamine derivatives, as well as their heterocyclic derivatives should be mentioned, for example phenyl-1-naphthylamine,
phenyl-2-naphthylamine,
N,N'-diphenyl-p-phenylenediamine,
N,N'-di-2-naphthyl-p-phenylenediamine,
N,N'-di-sec.-butyl-p-phenylenediamine,
6-ethoxy-2,2,4-trimethyl-1,2-dihydroquinoline,
6-dodecyl-2,2,4-trimethyl-1,2-dihydroquinoline,
monooctyliminodibenzyl, and
dioctyliminodibenzyl, and polymerised 2,2,4-trimethyl-1,2-dihydroquinoline, though in the case of the combined use of the compounds of the formula I with the above-mentioned amine compounds the stabilised polymer no longer has good colour properties, because of the tendency of the amine compounds to discolour.

2. UV-absorbers and light protection agents, such as:
(a) 2-(2-Hydroxyphenyl)-benztriazoles, for example the 5'-methyl, 3',5'-di-tert.-butyl, 5'-tert.-butyl, 5-chloro-3',5'-di-tert.-butyl, 5-chloro-3'-tert.-butyl-5'-methyl, 3',5'- di-tert.-amyl, 3'-methyl-5'-β-carbomethoxyethyl, and 5-chloro-3',5'-di-tert.-amyl derivative.

(b) 2,4-Bis-(2'-hydroxyphenyl)-6-alkyl-s-triazines, for example the 6-ethyl or 6-undecyl derivative.

(c) 2-Hydroxy-benzophenones, for example the 4-hydroxy, 4-methoxy, 4-octoxy, 4-decyloxy, 4-dodecyloxy, 4,2',4'-trihydroxy or 2'-hydroxy-4,4'-dimethoxy derivative.

(d) 1,3-Bis-(2'-hydroxy-benzoyl)-benzenes, for example, 1,3 - bis-(2'-hydroxy-4'-hexyloxy-benzoyl)-benzene, 1,3-bis-(2' - hydroxy-4'-octoxy-benzoyl)-benzene and 1,3-bis-(2'-hydroxy-4'-dodecyloxy-benzoyl)-benzene.

(e) Aryl esters of optionally substituted benzoic acids, for example phenylsalicylate, octylphenylsalicylate, benzoylresorcinol, dibenzoylresorcinol, 3,5-di-tert.-butyl-4-hydroxy-benzoic acid 2,4-di-tert.-butylphenyl ester or -octadecyl ester.

(f) Acrylates, for example α-cyano-β,β-diphenyl-acrylic acid ethyl ester or isooctyl ester, α-carbomethoxy-cinnamic acid methyl ester, α-cyano-β-methyl-p-methoxy-cinnamic acid methyl ester or butyl ester, and N-(β-carbo-methoxyvinyl)-2-methylindoline.

(g) Nickel compounds, for example nickel complexes of 2,2'-thiobis-(4-tert.-octylphenol), such as the 1:1 and 1:2 complex, optionally with other ligands such as n-butylamine, nickel complexes of bis-(4-tert.-octylphenyl)-sulphone, such as the 2:1 complex, optionally with other ligands such as 2-ethylcaproic acid, nickel dibutyldithio-carbamates, nickel salts of 4-hydroxy-3,5-di-tert.-butyl-benzyl-phosphonic acid monoalkyl esters, such as the methyl, ethyl or butyl ester, and the nickel complex of 2-hydroxy-4-methyl-phenyl-undecylketonoxime.

(h) Oxalic acid diamides, for example 4,4'-di-octyl-oxyanilide, 2,2'-di-octyloxy-5,5'-di-tert.-butyl - oxanilide, and 2,2'-di-dodecyloxy-5,5'-di-tert.-butyl-oxanilide.

3. Phosphites, such as triphenylphosphite, diphenyl-alkylphosphites, phenyldialkylphosphites, trinonylphenyl-phosphite, trilaurylphosphite, trioctadecylphosphite, 3,9-di-isodecyloxy-2,4,8,10-tetraoxo - 3,9 - diphosphaspiro-(5.5) - undecane and tri-(4-hydroxy-3,5-di-tert.-butyl-phenyl)-phosphite.

4. Nucleating agents, such as 4-tert.-butylbenzoic acid, adipic acid and diphenylacetic acid.

5. Peroxide-destroying compounds, such as esters of β-thiodipropionic acid, for example the lauryl, stearyl, myristyl or tridecyl ester. Salts of 2-mercaptobenzimid-azole, for example the zinc salt, and diphenylthiourea.

6. Other additives, such as plasticisers, antistatic agents, flameproofing agents, pigments, carbon black, asbestos, glass fibres, kaolin, talc and blowing agents.

When using the stabilisers of the formula I in combination with phenolic antioxidants, particularly good stabilising effects are achieved if peroxide-destroying compounds, such as higher alkyl esters of thiopropionic acid are employed simultaneously, since these peroxide-destroying compounds not only show synergism with the phenolic antioxidants, as is known, but also show synergism with the stabilisers of the formula I.

The compounds usable according to the invention can above all be manufactured by three reaction methods which are in themselves known:

A. Reaction of one mol of a salicylic acid hydrazide which is optionally substituted in the benzene nucleus with one mol of a salicylic acid chloride which is optionally substituted in the benzene nucleus.

B. Compounds of the formula I in which both benzene nuclei carry the same substituents can also be produced by heating a salicylic acid hydrazide which is optionally substituted in the benzene nucleus to temperatures of 120–200° C. in a suitable solvent (methylene glycol monomethyl ether, dimethylacetamide and others), with one mol of hydrazine being eliminated.

C. Reaction of one mol of hydrazine with 2 mols of a salicylic acid chloride which is optionally substituted in the benzene nucleus.

The invention is explained in more detail in the examples which follow.

Example 1

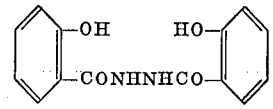

30.4 g. of salicylic acid hydrazide are dissolved in 500 ml. of dimethylacetamide and 34.8 g. of salicylic acid chloride are added dropwise over the course of 70 minutes at 25–40° C. The yellow solution is stirred for 3 hours at room temperature and is then poured into 1 litre of water, whereupon white, fine crystals precipitate. The substance is filtered off, washed with water and dried in vacuo at 60° C. The product is purified by recrystallisation from ethylene glycol monomethyl ether. The N,N' - bis - salicyloyl-hydrazine thus obtained (stabiliser No. 1), melts at 303° C.

Example 2

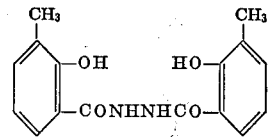

11.0 g. of o-cresotinic acid hydrazide are dissolved in 100 ml. of dimethylacetamide and 11.0 g. of o-cresotinic acid chloride are added dropwise over the course of 30 minutes at room temperature. A solution of 5.2 g. of pyridine in 10 ml. of dimethylacetamide is simultaneously added dropwise. The reaction mixture is stirred for 2 hours at room temperature and then poured into 1 litre of water, whereupon a white precipitate separates out. The substance is filtered off, washed with water, recrystallised from glacial acetic acid and dried for 10 hours at 100° C. in vacuo. The N,N'-bis-(2-hydroxy-3-methyl-benzoyl)-hydrazine thus obtained (stabiliser No. 2) melts at 265° C.

Example 3

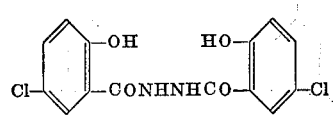

16.5 g. of 5-chloro-salicylic acid hydrazide are dissolved in 100 ml. of dimethylacetamide and 17.0 g. of 5-chloro-salicylic acid chloride are added dropwise over the course of 30 minutes at room temperature. A solution of 7.0 g. of pyridine in 20 ml. of dimethylacetamide is added dropwise simultaneously. The reaction mixture is kept for one hour at room temperature and is then poured into 2 litres of water, whereupon a white precipitate separates out. The substance is filtered off, washed with water and dried in vacuo at 60° C. The product is purified by twice boiling it with 250 ml. of methanol at a time, then dissolving it in 70 ml. of hot dimethylacet-amide and adding 500 ml. of methanol to the solution, whereupon slow crystallisation occurs. The N,N'-bis-(2-hydroxy-5-chlorobenzoyl)-hydrazine (stabiliser No. 3) thus obtained has a melting point of above 340° C.

If, in the present example, both the 5-chloro-salicylic acid hydrazide is replaced by the equivalent amount of one of the 5-alkyl-salicylic acid hydrazides of Table 1 below, and the 5-chloro-salicylic acid chloride is replaced by the equivalent amount of one of the 5-alkyl-salicylic acid chlorides of Table 1 below, and the analogous procedure is followed, the N,N'-bis-(2-hydroxy-5-alkylbenzoyl)-hydrazines having the melting points indicated are obtained:

TABLE 1

| Salicylic acid hydrazide | Salicylic acid chloride | Melting point of the N,N'-bis-(2-hydroxy-5-alkyl-benzoyl)-hydrazine |
|---|---|---|
| OH—C₆H₃(t-C₄H₉)—CONHNH₂ | OH—C₆H₃(t-C₄H₉)—COCl | 324° C. (Stabiliser No. 4). |
| OH—C₆H₃(t-C₈H₁₇)—CONHNH₂ | OH—C₆H₃(t-C₈H₁₇)—COCl | 315° C. (Stabiliser No. 5). |
| OH—C₆H₃(C₆H₅)—CONHNH₂ | OH—C₆H₃(C₆H₅)—COCl | >350° C. (Stabiliser No. 6). |
| OH—C₆H₃(CH₃—CH—C₆H₅)—CONHNH₂ | OH—C₆H₃(CH₃—CH—C₆H₅)—COCl | >300° C. (Stabiliser No. 7). |

Example 4

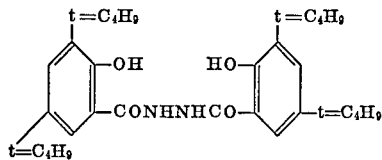

10.0 g. of 3,5-di-tert.-butyl-salicylic acid hydrazide are dissolved in 70 ml. of dimethylacetamide and 10.0 g. of 3,5-di-tert.-butyl-salicylic acid chloride are added dropwise at room temperature over the course of 30 minutes. A solution of 3.0 g. of pyridine in 10 ml. of dimethylacetamide is added dropwise simultaneously. The reaction mixture is stirred for one hour at room temperature and is then poured into 1 litre of water, whereupon a yellowish precipitate separates out. The substance is filtered off, washed with water and dried in vacuo at 100° C. The strongly yellow powder is boiled with 200 ml. of hexane, whereupon the yellow impurities dissolve. For further purification, the mixture is boiled with 100 ml. of isopropanol and cooled to 40° C., and the product subsequently filtered off. N,N'-Bis-(2-hydroxy-3,5-di-tert.-butylbenzoyl)-hydrazine (stabiliser No. 8), of melting point 305° C., is thus obtained.

Example 5

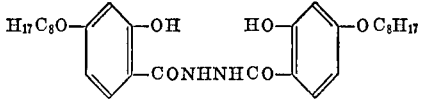

16.0 g. of 4-octoxy-salicylic acid hydrazide are dissolved in 150 ml. of dimethylacetamide and 16.0 g. of 4-octoxy-salicylic acid chloride are added at room temperature over the course of one hour. The reaction mixture is stirred for one hour at room temperature and is then poured into 2 litres of water, whereupon the reaction product precipitates out. It is filtered off, washed with water and dried in vacuo at 100° C. It is purified by recrystallisation from ethylene glycol monomethyl ether and rinsing with methanol. The N,N'-bis-(2-hydroxy-4-octoxybenzoyl)-hydrazine thus obtained (stabiliser No. 9) melts at 246° C.

If, in the present example, both the 4-octoxy-salicylic acid hydrazide is replaced by the equivalent amount of 4-methoxy-salicylic acid hydrazide and the 4-octoxy-salicylic acid chloride is replaced by the equivalent amount of 4-methoxy-salicylic acid chloride, and the analogous procedure is followed, N,N'-bis-(2-hydroxy-4-methoxybenzoyl)-hydrazine (stabiliser No. 10), having a melting point of 303–305° C., is obtained.

In the same way, 5-octoxy-salicylic acid hydrazide and 5-octoxy-salicylic acid chloride yield N,N'-bis-(2-hydroxy-5-octoxybenzoyl)-hydrazine (stabiliser No. 11) of melting point 260° C., and reaction of 4,6-dimethoxy-salicylic acid hydrazide (melting point 159° C.) with 4,6-dimethoxysalicylic acid chloride yields N,N'-bis-(2-hydroxy-4,6-dimethoxybenzoyl)-hydrazine (stabiliser No. 12).

An analogous procedure, using the appropriately substituted salicylic acid hydrazides and salicylic acid chlorides, yields the compounds of the following formulae:

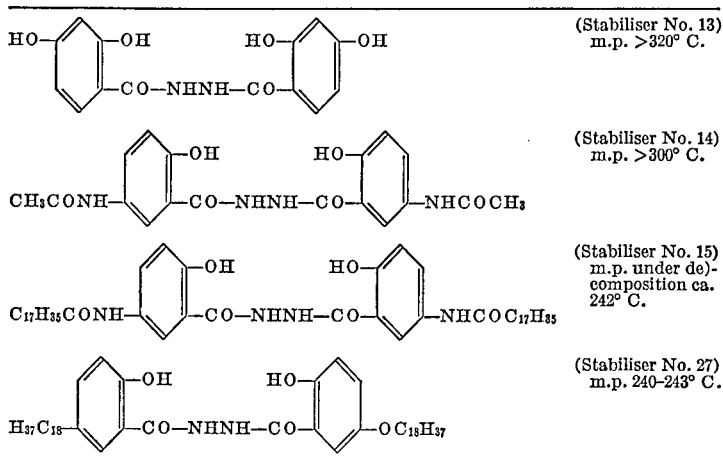

Example 6

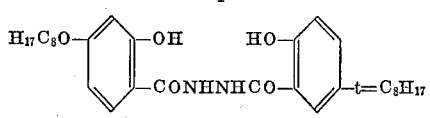

5.0 g. of 4-octoxy-salicylic acid hydrazide are first introduced into 40 ml. of dimethylacetamide and 4.8 g. of 5-tert.-octyl-salicylic acid chloride are added dropwise at room temperature over the course of one hour. A solution of 1.3 g. of pyridine in 10 ml. of dimethylacetamide is added dropwise simultaneously. The reaction mixture is stirred for one hour at room temperature and is then poured into 1 litre of water, whereupon the product precipitates in a colloidal form. The precipitate can be converted into a filtrable form by adding 5 g. of sodium bicarbonate in 50 ml. of water. After filtering off, the precipitate is dried at 100° C. in vacuo and recrystallised from ethylene glycol monomethyl ether. The N-(2-hydroxy - 4 - octoxybenzoyl) - N'-(2-hydroxy-5-tert.-octylbenzoyl)-hydrazine thus obtained (stabiliser No. 16) melts at 248° C.

Example 7

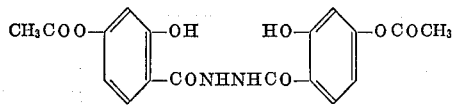

0.8 g. of sodium hydroxide and 2.4 g. of hydrazine hydrate are first introduced into 60 ml. of water. 20 g. of 4-acetoxy-salicylic acid chloride (melting point 90° C.) and a solution of 4.0 g. of sodium hydroxide in 40 ml. of water are simultaneously added slowly to the above solution at room temperature.

The reaction mixture is stirred for 2 hours at room temperature and the product is filtered off and recrystallised from methylcellosolve. The N,N'-bis-(2-hydroxy-4-acetoxybenzoyl)-hydrazine thus obtained (stabiliser No. 17) melts at 270° C.

If, in the present example, the 4-acetoxy-salicylic acid chloride is replaced by the equivalent amount of 4-stearyloxy-salicylic acid chloride and the analogous procedure is followed, N,N'-bis-(2-hydroxy-4-stearyloxybenzoyl)-hydrazine (stabiliser No. 18) is obtained.

Example 8

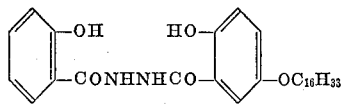

4.6 g. of salicylic acid hydrazide are dissolved in 100 ml. of dimethylacetamide and a solution of 12 g. of 5-hexadecyloxy-salicylic acid chloride, dissolved in 100 ml. of dimethylacetamide is added at room temperature over the course of 30 minutes. The solution is stirred for 3 hours at room temperature and is then poured into 1 litre of water. The product which precipitates is filtered off, dried and recrystallised from methyl ethyl ketone. N-(2-Hydroxybenzoyl) - N' - (2-hydroxy-5-hexadecyloxybenzoyl)-hydrazine (stabiliser No. 19), having a melting point of 237° C., is thus obtained.

If, in the present example, 5-hexadecyloxy-salicylic acid chloride is replaced by the equivalent amount of 5-stearyloxy-salicylic acid chloride and in other respects the analogous procedure is followed, N-(2-hydroxybenzoyl)-N'-(2-hydroxy-5-stearyloxybenzoyl)-hydrazine (stabiliser No. 20) of melting point 240° C. is obtained.

Equally, the use of 5-butoxy-salicylic acid chloride yields N - (2-hydroxybenzoyl)-N'-(2-hydroxy-5-butoxybenzoyl)-hydrazine (stabiliser No. 21) of melting point 275° C.

The previously known metal deactivators for polyolefines listed in Table 2 below were conjointly tested as comparison compounds in the test examples which follow:

TABLE 2

| Stabiliser No. | Chemical Designation |
| --- | --- |
| 22 | Salicylic acid hydrazide. |
| 23 | 5-tert.-Butyl-salicylic acid hydrazide. |
| 24 | 5-tert.-Octyl-salicylic acid hydrazide. |
| 25 | N-Acetyl-N'-salicyloyl-hydrazine. |
| 26 | N-Salicyloyl-N'-salicylidene-hydrazine. |

Example 9

(a) Production of the Test Specimens 100 parts of polypropylene (melt index 3.2 g./10 minutes, 230° C./2160 g.) are thoroughly mixed for 10 minutes, in a shaking apparatus, with 0.1 part of β-(3,5-di-t. butyl-4-hydroxy-phenyl)-propionic acid octadecyl ester, 0.3 part of dilaurylthiodipropionate and 0.5 part of a stabiliser listed in Table 3 below.

The mixture obtained is kneaded for 10 minutes in a Brabender plastograph at 200° C., 1.0% by weight of powdered copper (manufactured electrolytically, Merck) is then added, and the whole is thoroughly mixed for a further 2 minutes at the same temperature. The composition thus obtained is subsequently pressed in a platen press at 260° C. platen temperature to give 1 mm. thick sheets from which strips 1 cm. wide and 17 cm. long are punched.

The heat-stabilised test specimens without added copper, or with added copper but *without* metal deactivator, required for comparison purposes, are prepared analogously.

(b) Test

The effectiveness of the metal deactivators added to the test strips containing copper is tested by heat ageing in a circulating air oven at 149° C. and is compared with test strips not containing copper. For this purpose, 3 test strips of each formulation are employed. The incipient, easily visible decomposition of the test strip is defined as the end point.

TABLE 3

| | Days up to decomposition | |
| --- | --- | --- |
| | Without Cu | With Cu |
| Without stabiliser | 18-27 | <<1 |
| Stabiliser No.: | | |
| 1 | 17 | 17 |
| 3 | 40 | 40 |
| 4 | 23 | 23 |
| 5 | 29 | 23 |
| 10 | 40 | 35 |
| 11 | 44 | 27 |
| 16 | 37 | 33 |
| 19 | 135 | 51 |
| Comparison products: | | |
| 22 | 27 | 7 |
| 23 | 23 | 4 |
| 24 | 30 | 5 |
| 25 | 20 | 4 |
| 26 | 19 | 16 |

Example 10

(a) Manufacture of the Test Specimens 100 parts of polypropylene (melt index 3.2 g./10 minutes, 230° C./2160 g.) are thoroughly mixed for 10 minutes, in a shaking apparatus, with 0.1 part of β-(3,5-di-tert.-butyl - 4 - hydroxy-phenyl)-propionic acid octadecyl ester, 0.3 part of dilauryl thiodipropionate and 0.5 part of a stabiliser listed in Table 4 below.

The mixture obtained is kneaded in a Brabender plastograph at 200° C. for 10 minutes, 1.0% by weight of powdered copper (manufactured electrolytically, Merck) is then added and the whole is thoroughly mixed at the same temperature for a further 2 minutes. The composition thus obtained is subsequently pressed in a platen press at 260° C. platen temperature to give 1 mm. thick sheets, from which strips 1 cm. wide and 17 cm. long are punched by means of a punch tool.

The heat-stabilised test specimens without added copper or with added copper but *without* metal deactivator, required for comparison purposes, are manufactured analogously.

(b) Test

The effectiveness of the metal deactivators added to the test strips containing copper is tested by heat ageing in a circulating air oven at 135° C. and is compared with test strips not containing copper. For this purpose, 3 test strips of each formulation are employed. The incipient, easily visible decomposition of the test strip is defined as the end point.

The preservation factor indicated in the 4th column of Table 4 is characterised as follows:

Preservation factor $$= \frac{\text{days up to decomposition with copper}}{\text{days up to decomposition without copper}} \times 100$$

TABLE 4

| | Days up to decomposition | | Preservation factor |
|---|---|---|---|
| | Without Cu | With Cu | |
| Without stabiliser | 70-95 | <1 | <1 |
| Stabiliser No.: | | | |
| 1 | 82 | 82 | 100 |
| 3 | 109 | 112 | >100 |
| 4 | 128 | 128 | 100 |
| 5 | 125 | 108 | 86 |
| 8 | 114 | 105 | 92 |
| 9 | 155 | 130 | 84 |
| 10 | 116 | 119 | >100 |
| 16 | 202 | 186 | 92 |
| Comparison products: | | | |
| 22 | 87 | 24 | 28 |
| 23 | 117 | 53 | 45 |
| 24 | 115 | 46 | 40 |
| 25 | 90 | 27 | 30 |
| 26 | 86 | 72 | 84 |

Example 11

The test specimens described in Examples 9 and 10, without added copper, were additionally tested for their colour stability, and in particular (a) after incorporation (Table 5, column 2)
(b) after heat ageing at 149° C. (Table 5, column 3)
(c) after 1 week's treatment with boiling water (Table 5, column 4).

For Table 5, an empirical colour scale was used, in which 5 denotes absence of colour, 4 denotes a just perceptible, slight discolouration and 3, 2, 1 and <1 denote successively more intense discolouration.

TABLE 5

| | Colour assessment according to scale 1 to 5 | | |
|---|---|---|---|
| | After incorporation | After heat ageing | Boiling water, 1 week |
| Without stabiliser | 5 | 4 | 4 |
| Stabiliser No.: | | | |
| 1 | 4 | 2-3 | 3-4 |
| 2 | 3 | 2 | 2 |
| 4 | 4 | 2 | 2-3 |
| 5 | 4 | 2 | 2 |
| 9 | 3-4 | 1-2 | 2 |
| Comparison products: | | | |
| 22 | 1 | 1-2 | <1 |
| 23 | 1-2 | 1 | 1 |
| 24 | 1-2 | 1 | 1 |
| 25 | 1 | 1-2 | <1 |
| 26 | <1 | 1 | 2 |

Example 12

100 parts of polypropylene (melt index 3.2 g./10 minutes, 230° C./2160 g.) are thoroughly mixed for 10 minutes, in a shaking apparatus, with the additives listed in Table 6, in the concentrations indicated.

The mixture obtained is kneaded in a Brabender plastograph for 10 minutes at 200° C. and is then mixed with 1.0% by weight of powdered copper (manufactured electrolytically, Merck) and thoroughly mixed at the same temperature for a further 2 minutes. The composition thus obtained is subsequently pressed in a platen press at 260° C. platen temperature to give 1 mm. thick sheets, from which strips 1 cm. wide and 17 cm. long are punched by means of a punch tool.

The fully stabilised test specimens without added copper, required for comparison purposes, are manufactured analogously.

The dependence of the action of the stabilisers on the further additives is tested by heat ageing in a circulating air oven at 149° C. For results, see Table 6, column 4. The oven ageing times of the test specimens without added copper, required for comparison, are indicated in Table 6, column 3.

TABLE 6

| | | Oven ageing times in days at 149° C., up to incipient decomposition | |
|---|---|---|---|
| Mixture | Additives and concentration | Without added copper | With added copper |
| 1 | 0.2 part of Additive A, without stabiliser. | 12 | <1 |
| 2 | 0.5 part of Stabiliser 1; 0.2 part of Additive A. | 12 | 7 |
| 3 | 0.5 part of Stabiliser 1; 0.3 part of Additive D. | 12 | 8 |
| 4 | 0.3 part of Stabiliser 1; 0.1 part of Additive B; 0.3 part of Additive D. | 21 | 20 |
| 5 | 0.5 part of Stabiliser 1; 0.1 part of Additive A; 0.3 part of Additive F. | 15 | 11 |
| 6 | 0.4 part of Stabiliser 1; 0.1 part of Additive C. | 35 | 17 |
| 7 | 0.4 part of Stabiliser 1; 0.1 part of Additive E. | 40 | 17 |

Additives Used

A: 3-(3,5-Di-tert.-butyl-4-hydroxyphenyl)-propionic acid n-octadecyl ester
B: 1,1,3-Tris-(2 - methyl-4-hydroxy-5-tert.-butyl-phenyl)-butane
C: 1,3,5 - Trimethyl - 2,4,6-tris-(3,5-di-tert.-butyl-4-hydroxybenzyl)-benzene
D: Dilaurylthiodipropionate
E: 3-(3,5-Di-tert.-butyl-4-hydroxyphenyl)-propionic acid tetraester of pentaerythritol
F: Tris-(nonylphenyl)-phosphite.

Example 13

100 parts of polypropylene (melt index 3.2 g./10 minutes, 230° C./2160 g.) are thoroughly mixed for 10 minutes, in a shaking apparatus, with the additives listed in Table 7, in the concentrations indicated.

The mixture obtained is kneaded for 10 minutes in a Brabender plastograph at 200° C., 0.1% by weight of copper stearate is then added and the whole is thoroughly mixed for a further 2 minutes at the same temperature. The composition thus obtained is subsequently pressed in a platen press at 260° C. platen temperature to give 1 mm. thick sheets, from which strips 1 cm. wide and 17 cm. long are punched by means of a punch tool.

The fully stabilised test specimens without added copper stearate, required for comparison purposes, are manufactured analogously.

The effectiveness of the metal deactivators in the test strips containing copper stearate is tested by heat ageing in a circulating air oven at 149° C. for results, see Table 7, column 4. The oven ageing times of the test specimens without added copper stearate, required for comparison, are indicated in Table 7, column 3.

TABLE 7

| Mixture | Additives and concentration | Days to incipient decomposition 149° C. | |
|---|---|---|---|
| | | Without copper stearate | With copper stearate |
| 1 | 0.2 part of Additive A without stabilizer | 15 | ≪1 |
| 2 | 0.2 part of Additive A; 0.5 part of Stabiliser 1. | 17 | 9 |
| 3 | 0.1 part of Additive B; 0.3 part of Additive D; 0.5 part of Stabiliser 1. | 29 | 26 |
| 4 | 0.2 part of Additive A; 0.5 part of Stabiliser 3. | 35 | 15 |
| 5 | 0.1 part of Additive A; 0.3 part of Additive D; 0.5 part of Stabiliser 3. | 42 | 35 |

NOTE.—The designation of the additives is the same as in Example 12.

Example 14

100 parts of polypropylene (melt index 3.2 g./10 minutes, 230° C./2160 g.) are thoroughly mixed, in a shaking apparatus, with 0.1 part of 3-(3',5'-di-tert.-butyl-4'-hydroxyphenyl)-propionic acid octadecyl ester, 0.3 part of dilaurylthiodipropionate and a stabiliser listed in Table 8 below, in the amount indicated.

The mixture obtained is kneaded for 10 minutes in a Brabender plastograph at 200° C., 1.0% by weight of powdered copper (manufactured electrolytically, Merck) is then added and the whole is thoroughly mixed for a further 2 minutes at the same temperature. The composition obtained is subsequently pressed in a platen press at 260° C. platen temperature to give 1 mm. thick sheets from which strips 1 cm. wide and 17 cm. long are punched by means of a punch tool.

The effectiveness of the metal deactivators added to the test strips, as a function of the concentration, is tested by heat ageing in a circulating air oven at 149° C. The results are indicated in Table 8.

TABLE 8

[The days up to incipient decomposition at 149° C. are quoted]

| Stabiliser No. | Amount of stabiliser admixed | | | | |
|---|---|---|---|---|---|
| | 0 part | 0.1 part | 0.2 part | 0.3 part | 0.5 part |
| 1 | <1 | 5 | 12 | 16 | 18 |
| 3 | <1 | 10 | 25 | 31 | 35 |
| 8 | <1 | 6 | 9 | 16 | 17 |
| 10 | <1 | 14 | 29 | 32 | 36 |

Example 15

100 parts of polypropylene (melt index 3.2 g./10 minutes, 230° C./2160 g.) are thoroughly mixed for 10 minutes, in a shaking apparatus, with 0.2 part of one of the stabilisers listed in Table 9 below.

The mixture obtained is kneaded for 10 minutes in a Brabender plastograph at 200° C. and the composition thus obtained is subsequently pressed in a platen press at 260° C. platen temperature to give 1 cm. thick sheets from which strips 1 cm. wide and 17 cm. long are punched.

The effectiveness of the additives added to the test strips, in their capacity as antioxidants, is tested by heat ageing in a circulating air oven at 135° C. and 149° C., using an additive-free test strip for comparison. For this purpose, 3 test strips are employed of each formulation. The incipient, easily visible decomposition of the test strip is defined as the end point and the results are quoted in days.

TABLE 9

| | Days up to incipient decomposition | |
|---|---|---|
| | 135° C. | 149° C. |
| Without stabiliser | 1 | ½ |
| Stabiliser No.: | | |
| 9 | 48 | 6 |
| 16 | 41 | 4 |
| 19 | 95 | 25 |
| 20 | 68 | 22 |
| 27 | 57 | 13 |
| Comparison products: | | |
| 22 | 1 | ½ |
| 23 | 1 | ½ |
| 24 | 1 | ½ |
| 25 | 1 | ½ |
| 26 | 1 | ½ |

If, in this example, the stabiliser system indicated in Table 10 is employed instead of the above-mentioned stabilisers, the test results indicated in Table 10 are obtained:

TABLE 10

| | Days up to incipient decomposition | |
|---|---|---|
| | 135° C. | 149° C. |
| Without stabilizer | 1 | ½ |
| Stabilizer system: | | |
| 0.1% of stabiliser 9 plus 0.3% of dilaurylthiodipropionate | 92 | 31 |
| 19 | 120 | 35 |
| 20 | 110 | 42 |
| 27 | 88 | 29 |
| Comparison products: | | |
| 0.3% of dilaurylthiodipropionate | 22 | 9 |
| 0.1% of stabiliser 23 plus 0.3% of dilaurylthiodipropionate | 22 | 10 |

Example 16

100 parts of polypropylene (melt index 3.2 g./10 minutes, 230° C./2160 g.) are thoroughly mixed for 10 minutes, in a shaking apparatus, with 0.1 part of 3-(3,5-di-tert.-butyl - 4 - hydroxyphenyl)-propionic acid octadecyl ester (Additive A), 0.3 part of dilaurylthiodipropionate (Additive D) and 0.5 part of one of the stabilisers listed in Table 11 below.

The mixture obtained is kneaded for 10 minutes in a Brabender plastograph at 200° C. and the composition thus obtained is subsequently pressed in a platen press at 260° C. platen temperature to give 1 cm. thick sheets from which strips 1 cm. wide and 17 cm. long are punched.

The effectiveness of the stabilisers added to the test strips, in their capacity as synergistically acting antioxidants in the presence of the additives A and D, is tested by heat ageing in a circulating air oven at 135° C. and 149° C., a test strip only containing additives A and D being used for comparison. For this test, 3 test strips of each formulation are employed. The incipient, easily visible decomposition of the test strip is defined as the end point and the results are quoted in days.

TABLE 11

| | Days up to incipient decomposition | |
|---|---|---|
| | 135° C. | 149° C. |
| Only Additive A + D | 90 | 22 |
| Stabiliser No.: | | |
| 2 | 128 | 33 |
| 3 | 109 | 40 |
| 5 | 130 | 29 |
| 8 | 114 | 42 |
| 9 | 164 | 61 |
| 10 | 116 | 40 |
| 11 | 121 | 44 |
| 16 | 250 | 45 |
| 19 | >200 | 135 |
| 20 | >200 | 115 |
| Comparison products: | | |
| 22 | 87 | 24 |
| 24 | 98 | 23 |
| 25 | 90 | 20 |
| 26 | 86 | 19 |

Example 17

100 g. of unstabilised high pressure polyethylene powder ("Plastylène" of Messrs. Ethylène Plastique, Mazingarbe, France) are thoroughly mixed dry with 1.0 g. of 1,3-bis-(tert. - butyl - peroxyisopropylbenzene (Perkadox 14 of Messrs. Oxydo GmbH, Emmerich, Germany) and 0.2 g. of one of the stabilisers of Table 12 below. The mixture is processed for 10 minutes on a friction mill at 110° C. to give a homogeneous mass. This plastics mixture is pressed in a multi-platen press at 260° C. for 20 minutes to give 1 mm. thick sheets, and under these conditions crosslinking of the polymer by the added peroxide occurs. Test specimens of size 10 x 140 mm. are punched from the sheets thus manufactured by means of a punch tool.

The test specimens are suspended from a V2A–steel stirrup and are aged in a circulating air oven at 120° C. After the end of an induction period which is characteristic of the additive, the degraded material drips off; the results are quoted in days.

TABLE 12

|  | Days up to incipient dripping-off at 120° C. |
|---|---|
| Without stabiliser | 8 |
| Stabiliser No.: |  |
| 1 | 15 |
| 9 | 22 |
| 16 | 26 |
| Comparison products: |  |
| 22 | 8 |
| 26 | 15 |

Example 18

Stabilisation of Asbestos-Filled Polypropylene 100 parts of polypropylene ("Carlona" of Messrs. Shell) are thoroughly mixed with 65 parts of Chrysotile asbestos (Messrs. Montecatini), 0.5 part of 3-(3,5-di-tert.-butyl-4-hydroxyphenyl)-propionic acid octadecyl ester, 1.5 parts of 2-laurylthiodipropionate and 0.83 part of one of the additives listed in Table 13 below.

The mixture obtained is kneaded for 10 minutes in a Brabender plastograph and is subsequently pressed in a platen press at 260° C. to give 1 mm. thick sheets, from which strips 1 cm. wide and 17 cm. long are punched.

The effectiveness of the additives added to the test strips is tested by heat ageing in a circulating air oven at 149° C. The easily visible decomposition of the test strip, which manifests itself by chalking due to decomposed material, is defined as the end point. The results are quoted in days. (Table 13).

TABLE 13

|  | Days up to decomposition |
|---|---|
| Without stabiliser | 1.5 |
| Stabiliser No.: |  |
| 1 | 10 |
| 4 | 12 |
| 9 | 12 |
| 19 | 18 |

Example 19

75 parts of unstabilised polypropylene are thoroughly mixed for 10 minutes in a shaking apparatus with 0.1 part of β-(3,5-di-tert.-butyl-4-hydroxyphenyl)-propionic acid octadecyl ester, 0.3 part of dilaurylthiodipropionate and 0.5 part of stabiliser No. 1.

This mixture is introduced into a Brabender plastograph and is plasticised and homogenised for 5 minutes at 200° C. and 30 revolutions per minute. Thereafter a mixture of a further 25 parts of polypropylene and 0.1 part of Co-II stearate or Fe-II stearate or Cu-II stearate is added over the course of one minute. After completion of the addition, the torque is continuously recorded, in the form of a plastogram, for 10 minutes under the above-mentioned temperature and speed of rotation conditions. Since the torque, melt viscosity and molecular weight are directly related in the sense that under constant conditions a higher torque denotes a higher melt viscosity and hence a higher molecular weight of the polymer, a drop in the torque conversely indicates a degradation of the polymer.

The plastograms without added metal salt and without added deactivator, or with metal salts and without added deactivator, which are required for comparison purposes, are obtained analogously.

The degradation of the polymer during the kneading period of 10 minutes is expressed by the residual torque at the end of the kneading period, in percent of the initial torque (Table 14, column 5). The effectiveness of the metal deactivator can be seen by comparing the figures in column 5 for one and the same metal salt with and without stabiliser No. 1.

TABLE 14

| Metal salt | Stabiliser No. 1 | Torque in grams | | End/start ×100 |
|---|---|---|---|---|
|  |  | Start | End |  |
| Without additive |  | 1,280 | 1,180 | 92% |
| Co stearate | 0.5% | 1,050 | 700 | 67% |
| Do |  | 1,250 | 300 | 25% |
| Fe stearate | 0.5% | 1,100 | 420 | 38% |
| Do |  | 1,250 | 360 | 29% |
| Cu stearate | 0.5% | 1,250 | 950 | 76% |
| Do |  | 1,250 | 730 | 59% |

Example 20

(a) Manufacture of Test Specimens 100 parts of unstabilised polybutene-1 in powder form are thoroughly mixed, in a shaking apparatus, with 0.1 part of β-(3,5-di-tert.-butyl-4-hydroxyphenyl)-propionic acid octadecyl ester, 0.3 part of dilaurylthiodipropionate and 0.5 part of the stabiliser No. 1.

This mixture is plasticised and homogenised in a Brabender plastograph at 200° C. for 10 minutes, after the end of this time 1 part of powdered electrolytic copper is added, and the whole is then mixed for a further 2 minutes at the same temperature. The composition obtained is pressed in a platen press at 220° C. press temperature for 6 minutes to give 1 mm. thick sheets, and test strips 1 cm. wide and 14 cm. length are punched therefrom. The test specimens without copper salt, required for comparison purposes, are manufactured analogously.

(b) Test

The effectiveness of the metal activator added to the test specimens containing copper is tested by heat ageing in a circulating air oven at 110° C., up to the first signs of incipient decomposition of the test specimen. 3 test specimens are employed for each formulation, and the average of their oven life is taken.

The test specimens containing stabiliser 1 as yet show no signs of decomposition at a point in time at which the unstabilised test specimens have already decomposed completely.

What is claimed is:

1. A compound of the formula

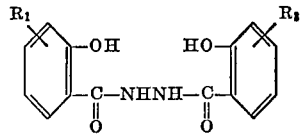

wherein $R_1$ and $R_3$ independently of one another are a member selected from the group consisting of acetoxy, propionyloxy, butyryloxy, isobutyryloxy, valeryloxy, caproyloxy, 2-ethylcaproyloxy, lauryloxy, capryloxy, myristyloxy, palmityloxy, stearyloxy, acrylyloxy, methacrylyloxy, crotonyloxy, isocrotonyloxy, oleoyloxy, benzoyloxy, and phenylacetoxy.

2. The compound according to Claim 1, of the formula

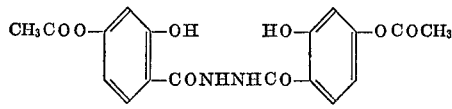

References Cited

UNITED STATES PATENTS

| 3,668,076 | 6/1972 | Rey et al. | 260—559 |
| 2,838,520 | 6/1958 | Mueller et al. | 260—559 |
| 3,444,179 | 5/1969 | Siegrist et al. | 260—307 |
| 3,641,045 | 2/1972 | Meek | 260—307 |

FOREIGN PATENTS

| 896,219 | 5/1962 | England | 260—307 |
| 218,896 | 5/1968 | Russia | 260—559 |

HARRY I. MOATZ, Primary Examiner

U.S. Cl. X.R.

260—404.5, 476, 479 R, 520, 521 R, 544 M, 45.85, 45.9 R